(12) United States Patent
Jo

(10) Patent No.: US 7,700,052 B2
(45) Date of Patent: Apr. 20, 2010

(54) OZONE GENERATOR

(75) Inventor: Soo Hwan Jo, Seoul (KR)

(73) Assignee: Dong Woo Kiyoun Inc., Kyungki-do (KR)

( * ) Notice: Subject to any disclaimer, the term of this patent is extended or adjusted under 35 U.S.C. 154(b) by 1067 days.

(21) Appl. No.: 11/308,003

(22) Filed: Mar. 2, 2006

(65) Prior Publication Data

US 2007/0053806 A1  Mar. 8, 2007

(51) Int. Cl.
*B01J 19/08* (2006.01)
(52) U.S. Cl. .............. 422/186.07; 204/176; 422/186.19
(58) Field of Classification Search ............. 422/186.07
See application file for complete search history.

(56) References Cited

U.S. PATENT DOCUMENTS

| | | | | |
|---|---|---|---|---|
| 4,011,165 A | * | 3/1977 | Filippov et al. | 422/186.19 |
| 4,504,446 A | * | 3/1985 | Kunicki et al. | 422/186.19 |
| 4,954,321 A | * | 9/1990 | Jensen | 422/186.19 |
| 6,270,733 B1 | * | 8/2001 | Rodden | 422/186.07 |
| 2005/0199484 A1 | * | 9/2005 | Olstowski | 204/176 |

FOREIGN PATENT DOCUMENTS

EP  1291320 A1 * 3/2003

* cited by examiner

*Primary Examiner*—Harry D Wilkins, III
*Assistant Examiner*—Bryan D. Ripa
(74) *Attorney, Agent, or Firm*—IPLA P.A.; James E. Bame

(57) ABSTRACT

Provided is an ozone generator for generating ozone using high voltage discharging between an electrode plate forming a first electrode and a heat sink forming a second electrode. The ozone generator includes: an inner tube and a middle tube each of which is concentrically disposed, the electrode plate being interposed between the inner tube and the middle tube; an adhesive sealing both ends of the electrode plate; an electrode pipe for electrically connecting to a power source and disposed within the electrode plate; a passage formed through a middle of the heat sink; and an outer tube installed in an inner periphery surface of the passage, the outer tube being concentrically disposed to maintain a predetermined distance from an outer periphery surface of the middle tube.

3 Claims, 3 Drawing Sheets

OZONE GENERATOR

BACKGROUND OF THE INVENTION

1. Field of the Invention

The present invention relates to an ozone generator, and more particularly, to an ozone generator with an increased ozone generating capacity through the use of a cooling passage to effectively dissipate heat created during an electrical discharging process for generating ozone, an increased product life by preventing oxidation of the discharge electrodes, and an increased electrical safety.

2. Description of the Related Art

Ozone generators are used domestically for indoor air purification and elimination of odors. For food produce, they are used to sterilize and remove pesticides from fruits and vegetables, and are applied in food storage containers. In fisheries, ozone generators are used in marine produce storage containers, freezers, and fish tanks, as well as in sterilization and disinfecting of germs in fish farms. In manufacturing, they are used for dying and bleaching, and their industrial applications include factory wastewater treatment, and sewage and water supply purification.

FIG. 1 illustrates a conventional ozone generator that uses a ceramic discharging method. In this schematic view of an ozone generator using a ceramic plate and sintered metal, the generator includes a power supply 10 for supplying power, an oscillator 11 for oscillation using the power supplied from the power supply 10, a high-voltage generator 12 for converting the power from the power supply 10 to a high voltage, electrodes 14 of sintered metal coated on either side of a ceramic plate 13, and an ozone generating portion 15 for generating ozone using the high voltage from the high-voltage generator 12.

This ceramic discharge-type ozone generator using sintered metal provides a required voltage for high voltage generation from the power supply 10, creates an oscillation frequency from the oscillator 11 using power from the power supply 10, and creates a high voltage of approximately 3 Kv or higher from the high-voltage generator 12 using the voltage from the power supply 10. Accordingly, the ozone generator 15 uses the electrodes 14 of sintered metal on each side of the ceramic plate 13 for discharging and generating ozone.

However, in such conventional generators, the electrodes are directly exposed to the discharging atmosphere and continuously oxidized. This oxidation corrodes the electrodes, and not only reduces their discharging effectiveness, but also decreases product lifespan. Additionally, an insulation problem in the discharging portion remains, compromising electrical safety.

SUMMARY OF THE INVENTION

The present invention is designed to solve the problems of the prior art, and therefore an object of the invention is to provide an ozone generator that blocks oxidation of the discharge electrodes to increase product longevity, while providing increased electrical safety and increasing ozone generating capacity by effectively dispersing heat generated by discharging through a cooling passage.

In order to accomplish the above objects, the present invention provides an ozone generator for generating ozone using high voltage discharging between an electrode plate forming a first electrode and a heat sink forming a second electrode, the ozone generator including: an inner tube and a middle tube each of which is made of ceramic and concentrically disposed, the electrode plate being interposed between the inner tube and the middle tube; an adhesive sealing both ends of the electrode plate; an electrode pipe made of metal for electrically connecting to a power source and disposed within the electrode plate, the electrode pipe including an opening at one end thereof for admitting cooling air for cooling heat generated during high-voltage discharging and a return hole at another end for reversing a flow of the cooling air; a passage formed through a middle of the heat sink; and an outer tube made of ceramic installed in an inner periphery surface of the passage, the outer tube being concentrically disposed to maintain a predetermined distance from an outer periphery surface of the middle tube.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, the embodiments of the present invention will be described in detail with reference to the accompanying drawings.

Figure 1:
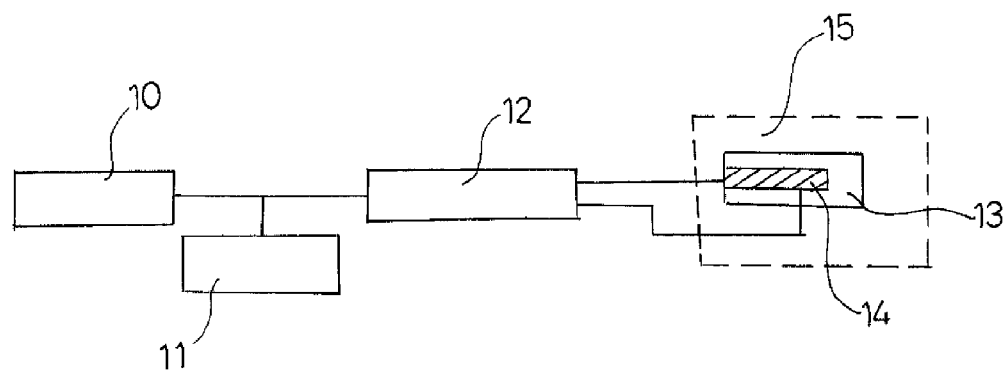
FIG. 1 is a schematic view of an ozone generator according to the related art.
Figure 2:
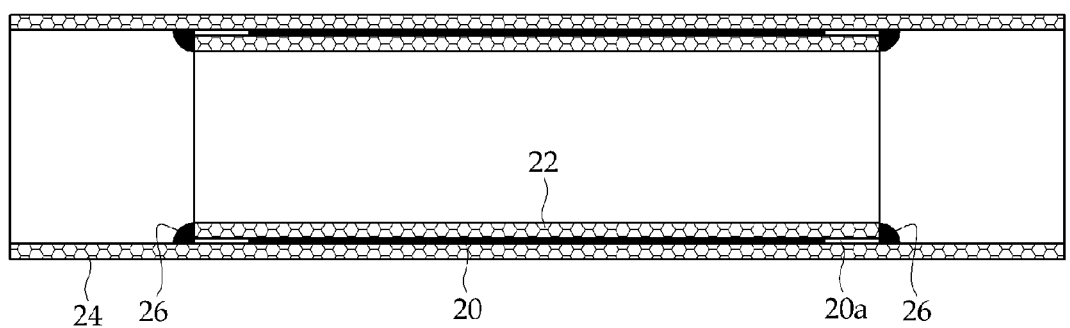
FIG. 2 is a sectional view of an electrode plate assembly for an ozone generator according to the present invention.
Figure 3:
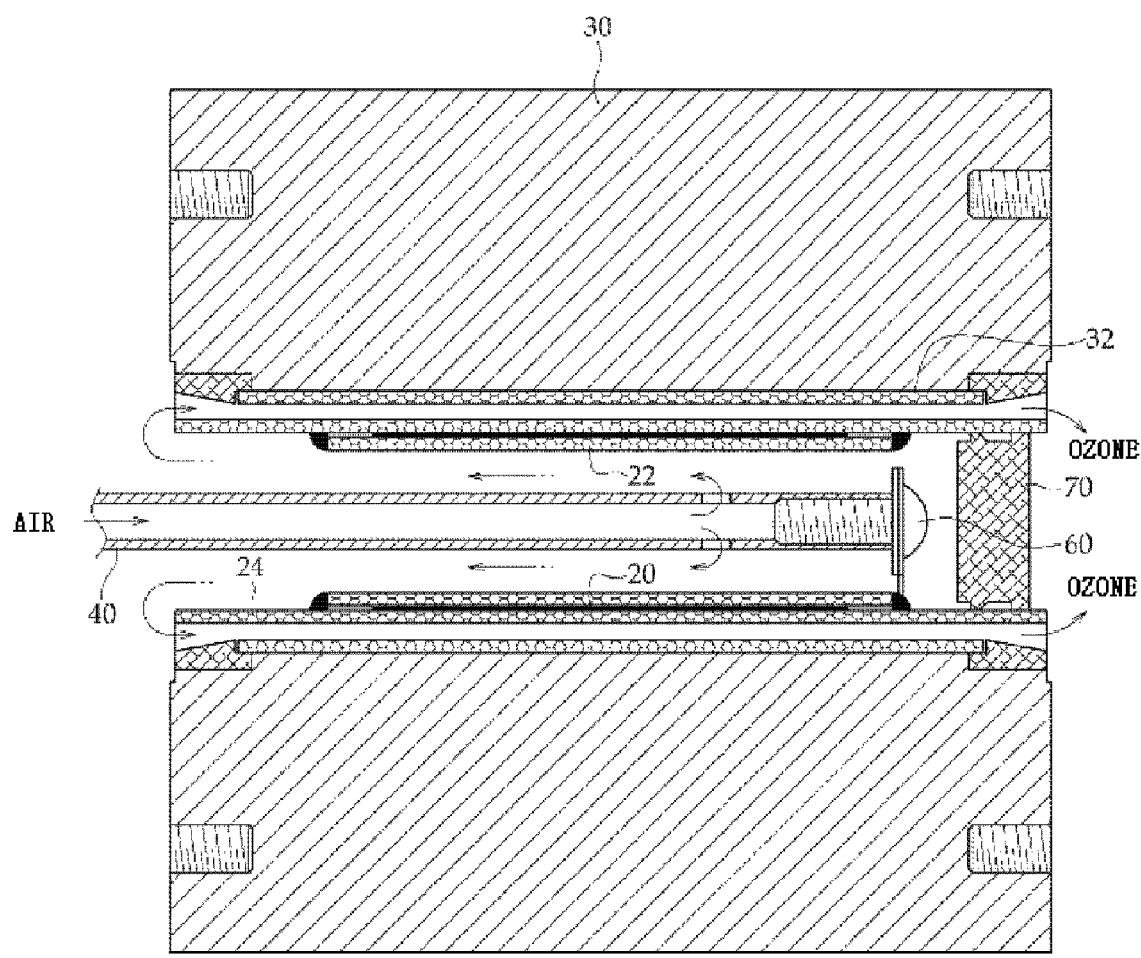
FIG. 3 is a sectional view showing a structure of a discharging unit of the ozone generator according to the present invention.
Figure 4:
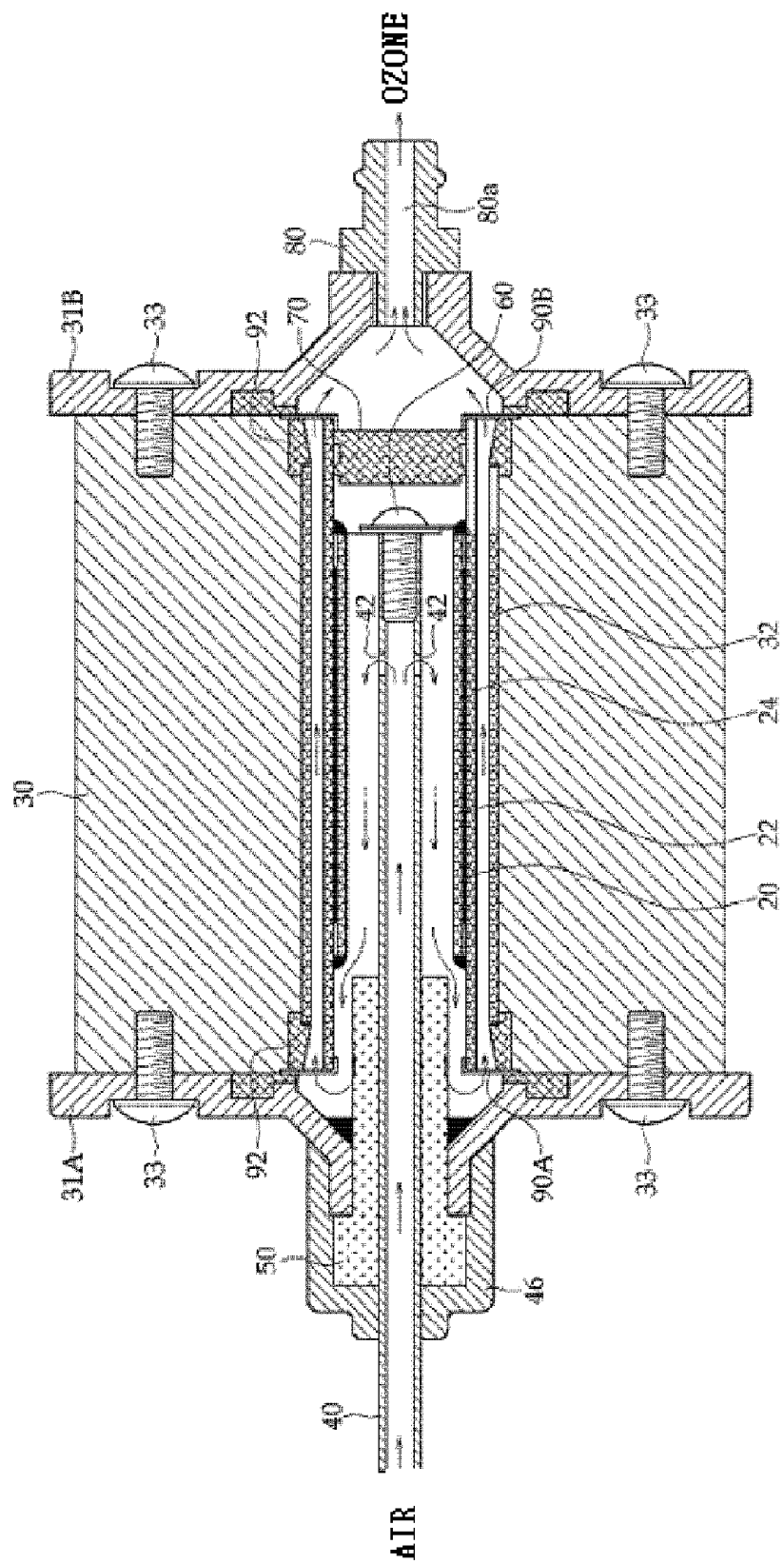
FIG. 4 is a sectional view showing an assembly of the ozone generator according to the present invention.

Referring to FIGS. 3 and 4, an ozone generator generates ozone using high-voltage discharging between an electrode plate 20 forming a first electrode and a heat sink 30 forming a second electrode. As shown in FIG. 2, the electrode plate 20 is interposed between a concentrically disposed inner tube 22 and middle tube 24. Both ends of the inner tube 22 are sealed with an adhesive 26. Here, the inner tube 22 and the middle tube 24 are formed of glass or a ceramic material, and the length of the inner tube 22 is shorter than that of the middle tube 24. The adhesive 26 used may be a silicon adhesive having high heat resistance.

Thus, the electrode plate 20 is sealed between the inner tube 22 and the middle tube 24 and will not be subject to oxidation in air during discharging. Accordingly, the electrode plate 20 is provided with a protective system for discharging.

The heat sink 30 has an outer tube 32 installed in an inner diameter of an opening formed through a center thereof, and the outer tube 32 is concentrically disposed to maintain a predetermined gap with the outer diameter of the middle tube 24. The heat sink 30 that is a conventional heat sink has a plurality of integrally-formed heat-dissipating fins extending radially from its outer surface.

As shown in FIG. 4, both ends of the heat sink 30 have a housing 31A and 31B affixed thereto by a screw 33. The housing 31A disposed at one end supports an electrode pipe 40 made of an industrial grade metal, and the electrode pipe 40 provides a passage for oxygen or air to pass through, while it also functions as a conductor for the flow of electricity used by the electrode plate 20 for discharging.

To form the passage for air (or oxygen), the outer diameter of the electrode pipe 40 is smaller than the inner diameter of the inner tube 22.

The electrode pipe 40 is supported through an insulator 50 by the housing 31A installed at one end of the heat sink 30, and the connecting portion of the insulator 50 and the housing 31A is protected by a safety tube 46 made of rubber.

Formed at the end portion of the electrode pipe 40 is a plurality of return holes 42 for reversing airflow. Also, an electrode plate fixing screw 60 is screwed at the end of the electrode pipe 40 to electrically connect to an electrode terminal 20a of the electrode plate 20.

A cover 70 made of rubber is located at the rear of an end portion of the electrode pipe 40, and the cover 70 is inserted into the inner diameter of the middle tube 24 to block the passage for cooling air discharged from the return hole 42 of the electrode pipe 40. A needle 80 in the housing 31B provides a discharging hole for the generated ozone.

The middle tube 24 is fixed inside the heat sink 30 by means of locators 90A and 90B disposed between the heat sink 30 and the housing 31A and 31B. Reference number 92 refers to a stopper.

The operation of the above structure according to the present invention will now be described.

The electrode pipe 40 and the heat sink 30 are electrically connected to the high-voltage generator and the discharging portion, and air (or oxygen) is supplied through the electrode pipe 40, as shown in FIG. 4.

Whenever high voltage is generated, the high voltage passes through the electrode pipe 40 and the electrode plate fixing screw 60 to the electrode plate 20 of the first electrode. The high voltage flows between the electrode plate 20 and the heat sink 30 to discharge electricity.

Here, the region of ozone generation resides in the space between the middle tube 24 and the outer tube 32, and ozone ($O_3$) formed in the space is discharged through the needle 80.

During discharging, the electrode plate 20 is sealed between the inner tube 22 and the middle tube 24 by a silicon adhesive 26, so that it is sealed from air (or oxygen), preventing oxidized corrosion thereof.

When high voltage flows to the electrode pipe 40, the connecting portion of the electrode pipe 40 is insulated by the insulator 50, so that there is no danger of electrocution.

The inventive ozone generator is cooled by air passages described in the following, so that ozone generation increases and the size of the generator can be decreased.

When (cooling) air flows toward the entrance of the electrode pipe 40, the air that was flowing to the right in FIG. 4 exits through the return hole 42 and is blocked by the cover, so that it is forced to reverse its direction and flow to the left through the space between the electrode pipe 40 and the inner tube 22. Again, the air is blocked by the left-side housing 31A, and flows through the space between the middle and outer tubes 24 and 32 back towards the right, and is finally discharged through a discharge hole 80a of the needle 80.

Thus, the cooling air that enters the electrode pipe 40 flows in an "S" pattern, encircling the inside and outside of the electrode plate 20, and cooling the electrode plate 20 forming the first electrode and the heat sink 30 forming the second electrode.

Accordingly, the ozone generator according to the present invention does not need to be large in size in order to have a lengthy cooling passage, and is that much more efficient in cooling.

The ozone generator according to the above-described aspects of the present invention seals and protects the electrode plate for longevity thereof, incorporates an insulator for electrically safe use, and increases output so that the size of the generator can be reduced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An ozone generator for generating ozone using high voltage discharging between an electrode plate (20) forming a first electrode and a heat sink (30) forming a second electrode, the ozone generator comprising:

an inner tube (22) and a middle tube (24) each of which is made of ceramic and concentrically disposed, the electrode plate (20) being interposed between the inner tube (22) and the middle tube (24), wherein the inner tube is shorter than the middle tube, wherein the electrode plate (20) is interposed and sealed between the inner tube (22) and the middle tube (24) so as not to be subject to oxidation in air during discharging;

an adhesive (26) sealing both ends of the electrode plate between the inner tube (22) and the middle tube (24);

an electrode pipe (40) made of metal for electrically connecting to a power source and disposed within the electrode plate (20), the electrode pipe including an opening at one end thereof for admitting cooling air for cooling heat generated during high-voltage discharging and a return hole (42) at a side surface portion at another end of the electrode pipe (40) at another end for reversing a flow of the cooling air, wherein the electrode pipe (40) comprises an electrode plate fixing screw (60) screwed at the another end of the electrode pipe (40) to electrically connect to an electrode terminal (20a) of the electrode plate (20) for providing electricity to the electrode plate (20);

a passage formed through a middle of the heat sink (30); and an outer tube (32) made of ceramic installed in an inner periphery surface of the passage, the outer tube (32) being concentrically disposed to maintain a predetermined distance from an outer periphery surface of the middle tube (24), wherein the heat sink (30) comprises a plurality of integrally-formed heat-dissipating fins extending radially from an outer surface of the heat sink (30).

2. The ozone generator of claim 1, further comprising a housing (31A) installed at one end of the heat sink (30) to support one end of the electrode pipe (40) through an insulator (50).

3. The ozone generator of claim 1, further comprising a cover (70) inserted into an inner periphery surface at one end of the middle tube (24), the cover (70) blocking a passage of the cooling air discharged from the return hole (42) of the electrode pipe (40).

* * * * *